UNITED STATES PATENT OFFICE.

BENJAMIN D. STAFFORD, OF DES MOINES, ASSIGNOR OF ONE-HALF TO GEORGE B. ALBERT, OF MARSHALLTOWN, IOWA.

COMPOSITION FOR PLASTER AND COATING WALLS.

SPECIFICATION forming part of Letters Patent No. 507,942, dated October 31, 1893.

Application filed May 12, 1893. Serial No. 474,041. (No specimens.)

*To all whom it may concern:*

Be it known that I, BENJAMIN D. STAFFORD, a citizen of the United States of America, residing at Des Moines, in the county of Polk and State of Iowa, have invented a new and useful Composition for Making Mortar and Coating Walls, of which the following is a specification.

My object is to provide a dry compound that is specially adapted to be used in making a brown mortar, or a fine white coating and finish for the walls and ceilings of buildings, and also for making a plastic composition that may be advantageously handled and shaped for various purposes before it is set and stiffened and hardened.

My composition consists of the following ingredients combined in about the proportions stated, viz: powdered borax, three and a third ($3\frac{1}{3}$) parts; powdered alum, three and a third ($3\frac{1}{3}$) parts; flour, preferably wheat, three and a third ($3\frac{1}{3}$) parts; powdered sugar twenty six and two thirds ($26\frac{2}{3}$) parts; dry slaked lime, sixty three and one third ($63\frac{1}{3}$) parts. These ingredients are thoroughly mixed, by means of a mixing machine, or in any suitable way, and in any quantity desired, and then put up in suitable boxes, bags or packages to facilitate handling and preserving the matter for use wherever and whenever desired.

To make brown mortar I add to one pound of plaster-of-paris, half an ounce ($\frac{1}{2}$) of my dry composition and then mix it with a sufficient quantity of hair and coarse sand and water to make it of such a consistency as is best adapted to be handled and applied to a wall by means of plasterers' tools in a common way. The plaster-of-paris will not become set or stiff until about three (3) hours after the mortar is prepared and consequently the mortar can be worked and applied advantageously within the said period of time. In addition to the advantages gained by facilitating the making and using of mortar the finished product upon a wall will be of better quality, in that it will become harder and have a greater tensile strength than mortar made from a less number of similar ingredients.

What I claim, and desire to secure by Letters Patent of the United States, is—

The herein-described composition of matter to be used for making mortar and coating for walls, consisting of powdered borax, powdered alum, wheat flour, powdered sugar, and dry slaked lime in about the proportions specified.

BENJAMIN D. STAFFORD.

Witnesses:
W. A. BALLARD,
THOMAS G. ORWIG.